US012242236B2

(12) United States Patent
Hasegawa et al.

(10) Patent No.: US 12,242,236 B2
(45) Date of Patent: Mar. 4, 2025

(54) CONTROL SYSTEM AND CONTROL METHOD FOR REMOTELY INSTALLED CONTROLLER DEVICES

(71) Applicants: Yokogawa Electric Corporation, Musashino (JP); NTT Communications Corporation, Tokyo (JP)

(72) Inventors: Yuuzou Hasegawa, Tokyo (JP); Kazuyuki Ito, Tokyo (JP); Masanori Shibayama, Tokyo (JP)

(73) Assignees: YOKOGAWA ELECTRIC CORPORATION, Tokyo (JP); NTT Communications Corporation, Tokyo (JP)

( * ) Notice: Subject to any disclaimer, the term of this patent is extended or adjusted under 35 U.S.C. 154(b) by 0 days.

(21) Appl. No.: 18/079,632

(22) Filed: Dec. 12, 2022

(65) Prior Publication Data
US 2023/0195070 A1    Jun. 22, 2023

(30) Foreign Application Priority Data
Dec. 17, 2021  (JP) ................................ 2021-205142

(51) Int. Cl.
G05B 19/05    (2006.01)
G06F 11/30    (2006.01)

(52) U.S. Cl.
CPC ......... *G05B 19/054* (2013.01); *G05B 19/058* (2013.01); *G06F 11/3006* (2013.01); *G06F 11/3055* (2013.01); *G06F 11/3089* (2013.01)

(58) Field of Classification Search
None
See application file for complete search history.

(56) References Cited

U.S. PATENT DOCUMENTS

| | | | |
|---|---|---|---|
| 5,088,021 A * | 2/1992 | McLaughlin | G05B 9/03 |
| | | | 714/11 |
| 5,898,829 A | 4/1999 | Morikawa | |
| 6,272,386 B1 * | 8/2001 | McLaughlin | G05B 19/4184 |
| | | | 700/82 |

(Continued)

FOREIGN PATENT DOCUMENTS

| | | | | |
|---|---|---|---|---|
| CA | 3156775 A1 * | 5/2021 | ............. | G06F 9/485 |
| EP | 3715970 A1 | 9/2020 | | |

(Continued)

OTHER PUBLICATIONS

Machine Translation of Chinese Patent Application CN 112995001 A, Jun. 18, 2021. (Year: 2021).*

(Continued)

*Primary Examiner* — Steven G Snyder
(74) *Attorney, Agent, or Firm* — WHDA, LLP

(57) ABSTRACT

A process control system 100 includes a plurality of controller devices 10 each of which performs process control on a plant, and an input-output device 20 that is connected to a target device of the process control. The input-output device 20 is installed in a different on-premise environment from the plurality of controller devices 10. Each of the controller devices 10 is connected to the input-output device 20 by a different closed network 40, and transmits and receives information on the process control on the plant to and from the input-output device 20.

6 Claims, 9 Drawing Sheets

(56) References Cited

U.S. PATENT DOCUMENTS

| | | | |
|---|---|---|---|
| 10,152,048 B2* | 12/2018 | Hefeeda | G05B 19/4185 |
| 10,573,147 B1* | 2/2020 | Mousavi | G08B 21/02 |
| 10,917,358 B1* | 2/2021 | Herle | G06F 9/485 |
| 11,481,282 B2* | 10/2022 | McLaughlin | G06F 11/2028 |
| 12,069,498 B2* | 8/2024 | Shahdad | H04W 24/08 |
| 2013/0041485 A1* | 2/2013 | Gunzert | H04L 41/0803 700/79 |
| 2013/0211546 A1* | 8/2013 | Lawson | H04L 67/02 700/9 |
| 2013/0268672 A1* | 10/2013 | Justafort | H04L 67/10 709/226 |
| 2015/0036480 A1* | 2/2015 | Huang | G06F 9/5077 370/220 |
| 2015/0378356 A1* | 12/2015 | Hefeeda | G05B 19/4185 700/9 |
| 2017/0199515 A1* | 7/2017 | Bhat | G05B 9/03 |
| 2018/0321662 A1 | 11/2018 | Nixon et al. | |
| 2019/0042378 A1* | 2/2019 | Wouhaybi | H04L 67/10 |
| 2020/0103861 A1* | 4/2020 | Flood | G05B 19/4185 |
| 2020/0310920 A1* | 10/2020 | McLaughlin | G05B 19/4185 |
| 2022/0353244 A1* | 11/2022 | Kahn | H04L 67/12 |
| 2024/0022932 A1* | 1/2024 | Shahdad | H04W 24/08 |

FOREIGN PATENT DOCUMENTS

| | | | | |
|---|---|---|---|---|
| JP | 2003-140986 A | 5/2003 | | |
| JP | 2004-112246 A | 4/2004 | | |
| JP | 4099816 B2 | 6/2008 | | |
| WO | WO-2018231932 A1 * | 12/2018 | | G06Q 10/04 |
| WO | WO-2023091036 A1 * | 5/2023 | | G06F 1/3228 |

OTHER PUBLICATIONS

'The State of Cloud-Based Automation Today' by Stephanie Neil, Sep. 14, 2021. (Year: 2021).*

'Industrial Automation as a Cloud Service' by Hegazy and Hefeeda, IEEE Transactions on Parallel and Distributed Systems, vol. 26, No. 10, Oct. 2015. (Year: 2015).*

Extended European Search Report dated Apr. 28, 2023, issued in counterpart EP Application No. 22213458.7. (9 pages).

Office Action dated Nov. 26, 2024, issued in counterpart JP application No. 2021-205142, with English translation. (8 pages).

* cited by examiner

CONTROL SYSTEM AND CONTROL METHOD FOR REMOTELY INSTALLED CONTROLLER DEVICES

CROSS-REFERENCE TO RELATED APPLICATION

The present application claims priority to and incorporates by reference the entire contents of Japanese Patent Application No. 2021-205142 filed in Japan on Dec. 17, 2021.

FIELD

The present invention relates to a control system and a control method.

BACKGROUND

Conventionally, a controller device that performs process control on a plant is operated in an on-premise environment (hereinafter, simply referred to as an "on-premise" as appropriate) in the plant. In this case, the controller device is configured with dedicated hardware and has a configuration that is less likely to be broken down and that is highly available. Furthermore, the controller device may have a redundant configuration and therefor may have a configuration that is more highly available.

Patent Literature 1: Japanese Patent No. 4099816

However, in the conventional technology as described above, the controller device that performs the process control is constructed in the on-premise, and therefore, it is difficult to cooperate with remote operation and an external system (System of Systems). In contrast, if a control system is constructed in a cloud environment (hereinafter, simply referred to as a "cloud" as appropriate), a cloud infrastructure and a communication infrastructure do not meet an availability requirement that is demanded for the process control on the plant, so that it is extremely difficult to realize the same level of availability as the on-premise.

An object of the present invention is to realize effective process control on a plant while maintaining high availability.

SUMMARY

According to an aspect of the embodiments, a control system includes, a plurality of controller devices each performing process control on a plant, and an input-output device that is connected to a target device of the process control, wherein the input-output device is installed in a different on-premise environment from the plurality of controller devices, each of the controller devices is connected to the input-output device by a different communication network, and includes a control unit that transmits and receives information on the process control to and from the input-output device.

According to an aspect of the embodiments, a control method including a plurality of controller devices each performing process control on a plant; and an input-output device that is connected to a target device of the process control, wherein the input-output device is installed in a different on-premise environment from the plurality of controller devices, and each of the controller devices is connected to the input-output device by a different communication network, the control method includes, transmitting and receiving information on the process control between each of the controller devices and the input-output device.

DETAILED DESCRIPTION OF THE PREFERRED EMBODIMENTS

Modes for carrying out the present invention (hereinafter, appropriately referred to as embodiments) for a control system and a control method according to the present invention will be described in detail below based on the drawings. The present invention is not limited by the embodiments described below.

Embodiment

A configuration of a process control system 100 according to one embodiment, an overview of a conventional process control system 100-P, a configuration of each of devices according to the present embodiment, specific examples of the process control system 100, and the flow of each of processes will be described below in sequence, and effects of the embodiment will be described last.

1. Configuration of Process Control System 100

Figure 1:
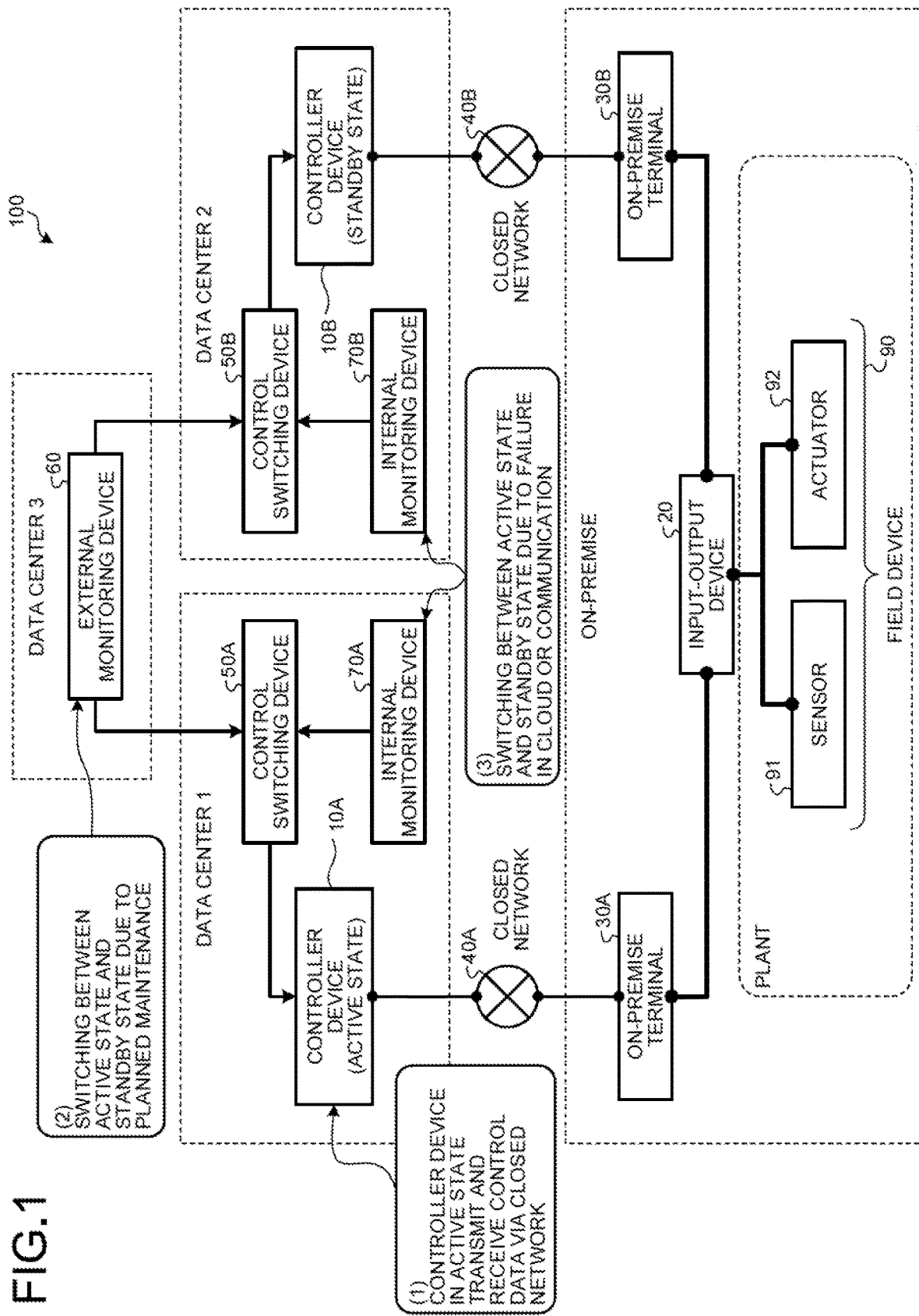
FIG. 1 is a diagram illustrating a configuration example of a process control system according to one embodiment.

The configuration of the process control system 100 according to the present embodiment will be described in detail below with reference to FIG. 1. FIG. 1 is a diagram illustrating the configuration of the process control system according to the present embodiment. An overall configuration example of the process control system 100 will be described below, and thereafter, a control data transmission reception process, a state switching process performed by an external monitoring device 60, and a state switching process performed by an internal monitoring device 70 will be described in sequence.

1-1. Overall Configuration Example of Process Control System 100

An overall configuration of the process control system 100 according to the present embodiment will be described in detail below. Meanwhile, in the present embodiment, process control on a plant will be described as one example, but a target is not specifically limited, and the technology is applicable to various systems in which a controller device 10 controls a target device.

The process control system 100 includes the controller devices 10 (10A, 10B), an input-output device 20, on-premise terminals 30 (30A, 30B), closed networks 40 (40A, 40B), control switching devices 50 (50A, 50B), the external monitoring device 60, internal monitoring devices 70 (70A, 70B), and field devices 90 (a sensor 91 and an actuator 92). Further, the process control system 100 includes, as environments in which various devices as described above are installed, a data center 1, a data center 2, and a data center 3 that construct a cloud environment, and an on-premise, such as the premise of the plant.

In the data center 1 illustrated in FIG. 1, the controller device 10A in an active state, the control switching device 50A, and the internal monitoring device 70A are installed. The controller device 10A, the control switching device 50A, and the internal monitoring device 70A are communicably connected to one another in a wired or wireless manner via a predetermined communication network (not illustrated). Each of the devices, such as the controller device 10A, the control switching device 50A, and the internal monitoring device 70A, is implemented by using a cloud service. For example, each of the devices may be implemented by a virtual machine that is virtually generated by using physical resources, such as a physical memory, a physical processor, and a physical disk, in the data center 1 or may be implemented by a container. Furthermore, each of the devices is not limited to a cloud service, such as the virtual machine, but may be implemented by housing or hosting or may be implemented by a physical device that is physically provided. Meanwhile, the data center 1 may include the plurality of controller devices 10A, the plurality of control switching devices 50A, and the plurality of internal monitoring devices 70A.

In the data center 2 illustrated in FIG. 1, the controller device 10B in a standby state, the control switching device 50B, and the internal monitoring device 70B are installed. The controller device 10B, the control switching device 50B, and the internal monitoring device 70B are communicably connected to one another in a wired or wireless manner via a predetermined communication network (not illustrated). Each of the devices, such as the controller device 10B, the control switching device 50B, and the internal monitoring device 70B, is implemented by using a cloud service. For example, each of the devices may be virtually implemented by using physical resources in the data center 2. Furthermore, each of the devices may be implemented by housing or hosting or may be implemented by a physical device. Meanwhile, the data center 2 may include the plurality of controller devices 10B, the plurality of control switching devices 50B, and the plurality of internal monitoring devices 70B.

In the data center 3 illustrated in FIG. 1, the external monitoring device 60 that is implemented by a physical device or that is virtually implemented by using physical resources is installed. The data center 3 may include the plurality of external monitoring devices 60.

In the example illustrated in FIG. 1, the two different data centers in each of which the controller device 10 is installed are illustrated, but it may be possible to provide three or more different data centers in each of which the controller device 10 is installed. Furthermore, it may be possible to provide two or more different data centers in each of which the external monitoring device 60 is installed. Moreover, various devices included in each of the data centers may be communicably connected to one another in a wired or wireless manned via a predetermined communication network (not illustrated).

In the on-premise illustrated in FIG. 1, the input-output device 20, the on-premise terminal 30A, and the on-premise terminal 30B are installed. The input-output device 20, the on-premise terminal 30A, and the on-premise terminal 30B are communicably connected to one another in a wired or wireless manner via a predetermined communication network. Further, the on-premise as described above may include the plurality of input-output devices 20, the plurality of on-premise terminals 30A, and the plurality of on-premise terminals 30B.

Here, the input-output device 20 is implemented by a physical device that is physically installed, and is connected to the field devices 90, such as the sensor 91 and the actuator 92, in a plant that is the on-premise environment. Further, the input-output device 20 is connected to the controller device 10A that is installed in the data center 1, via the closed network 40A that is a dedicated line and the on-premise terminal 30A that is a data gateway or the like. Furthermore, the input-output device 20 is similarly connected to the controller device 10B that is installed in the data center 2, via the closed network 40B and the on-premise terminal 30B. Moreover, the input-output device 20 may be connected to the controller device 10 that is installed in a data center (not illustrated), via the closed network 40 and the on-premise terminal 30.

1-2. Control Data Transmission Reception Process

A control data transmission reception process will be described below as a process that is performed by the process control system 100. As illustrated in FIG. 1, the controller device 10A that is installed in the data center 1 and that is in the active state transmits and receives control data to and from the input-output device 20 (see FIG. 1(1)).

For example, the controller device 10A receives control data that the input-output device 20 has acquired from the field devices 90 in the plant. In contrast, the input-output device 20 receives control data from the controller device 10A and provides the control data to the field devices 90 in the plant. Through the process as described above, the control data is reflected in the process control on the plant. Meanwhile, in the example illustrated in FIG. 1, the controller device 10B that is installed in the data center 2 and that is in the standby state does not transmit and receive control data to and from the input-output device 20; however, the plurality of controller devices 10 in the active states may transmit and receive control data.

Here, the control data is data including process data, a control parameter, and the like. Examples of the process data include a detection result (for example, pressure, temperature, a flow rate, or the like) of the sensor 91 that is the field device 90. Examples of the control parameter include a setting parameter for operation control on the plant, and in particular, a setting parameter of the actuator 92 that is the field device 90. Each of the controller devices 10 performs calculation, such as simulation, by using the control data, and controls the plant by using a calculation result. Meanwhile, control of the plant corresponds to, for example, various kinds of control, such as a change in an opening and closing amount of a valve and a change in a flow rate of a resource in the plant, which contributes to safe operation of the plant.

1-3. State Switching Process Performed by External Monitoring Device 60

A state switching process performed by the external monitoring device 60 will be described below as the process that is performed by the process control system 100. As illustrated in FIG. 1, the external monitoring device 60 that is installed in the data center 3 switches among the active state, the standby state, and the like due to planned maintenance or the like (see FIG. 1(2)).

For example, the external monitoring device 60 receives a notice that announces planned maintenance of a cloud infrastructure or a communication infrastructure. At this time, if the controller device 10A is a target for the maintenance, the external monitoring device 60 transmits a state switching notice to the control switching device 50A. The control switching device 50A that has received the state switching notice switches the state of the controller device 10A from the active state to the standby state or a stopped state at a designated time. In contrast, the external monitoring device 60 transmits the state switching notice to the control switching device 50B. The control switching device 50B that has received the state switching notice switches the state of the controller device 10B from the standby state to the active state at a designated time.

1-4. State Switching Process Performed by Internal Monitoring Device 70

A state switching process performed by the internal monitoring device 70 will be described below as the process that is performed by the process control system 100. As illustrated in FIG. 1, the internal monitoring device 70 that is installed in the data center 1 or the data center 2 switches among the active state, the standby state, and the like due to a failure in the cloud or a failure in communication (see FIG. 1(3)).

For example, the internal monitoring devices 70 (70A, 70B) monitor the states of the cloud infrastructure and the communication infrastructure. At this time, if there is abnormality in the cloud infrastructure or the communication infrastructure, the internal monitoring devices 70 transmit notices to the control switching devices 50. As a specific example, if there is abnormality in the cloud infrastructure related to the data center 1, the internal monitoring device 70A detects the abnormality and transmits a notice indicating the abnormality to the control switching device 50A. Further, the control switching device 50A that has received the notice switches the state of the controller device 10A from the active state to the standby state or the stopped state at a designated time. In contrast, the control switching device 50B that has received the notice switches the state of the controller device 10B from the standby state to the active state at a designated time.

2. Overview of Conventional Process Control System

A difference between the conventional process control system 100-P and the process control system 100 according to the present embodiment will be described below. In the following, the conventional process control system 100-P will be described first, and thereafter, the process control system 100 according to the present embodiment will be described.

2-1. Conventional Process Control System 100-P

Figure 2:
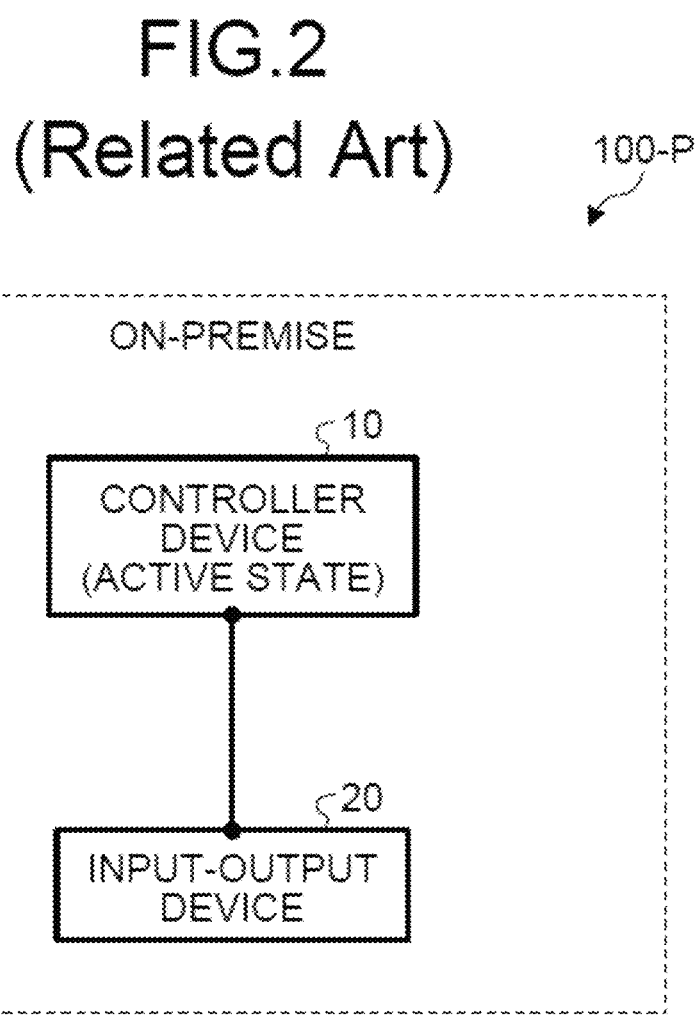
FIG. 2 is a diagram illustrating an overview of a conventional process control system.

The process control system 100-P will be described below with reference to FIG. 2. FIG. 2 is a diagram illustrating an overview of the conventional process control system. As illustrated in FIG. 2, the conventional process control system 100-P includes the controller device 10 that is in the active state and the input-output device 20. Further, the controller device 10 and the input-output device 20 are installed in an on-premise environment that is the premise of the plant or the like. At this time, the controller device 10 is configured with dedicated hardware, and therefore has a configuration that is less likely to be broken down and that is highly available. Furthermore, the controller device 10 can be duplicated, so that it is possible to realize higher availability.

However, the conventional process control system 100-P has a problem as described below. Firstly, the conventional process control system 100-P is configured in the on-premise, and therefore, it is difficult to cooperate with remote operation and an external system. Secondly, the conventional process control system 100-P includes a hardware device, and therefore, a maintenance cost increases.

To solve the problems with the on-premise as described above, it may be possible to use the controller device 10 in a cloud environment, but there is a problem as described below. As a premise, high availability that is aimed at by the controller device 10 that performs process control in the plant or the like means that a control system with periodicity, such as a 1-second period, is constantly and normally operated for 24 hours, 365 days. In other words, if the control system is constructed on the cloud, the cloud infrastructure, such as a data center, or the communication infrastructure, such as a communication infrastructure between the cloud and the on-premise, needs to meet the requirement as described above. However, a cloud vender and a communication vender that can ensure the requirement are not present, and therefore, it is extremely difficult to realize, on the cloud, the same level of availability as the on-premise.

2-2. Process Control System 100

In contrast, as described above, the process control system 100 according to the present embodiment illustrated in FIG. 1 includes the plurality of controller devices 10 that perform the process control on the plant and the input-output device 20 that is connected to a target device of the process control. Here, the input-output device 20 is installed in a different on-premise environment from the plurality of controller devices 10. Further, each of the controller devices 10 is connected to the different input-output device 20 via the different closed network 40, and transmits and receives information on the process control to and from the input-output device 20. In this manner, in the process control system 100, the plurality of controller devices 10 are installed in the different data centers and connected by different communication paths, so that it is possible to extremely reduce the possibility that all of the controller devices 10 are in the stopped state and it is possible to reduce a downtime.

Furthermore, as described above, the process control system 100 according to the present embodiment illustrated in FIG. 1 further includes the control switching devices 50 that switch the states of the plurality of controller devices 10 to the active states, the standby states, or the stopped states, and the monitoring devices that receive information (for example, an announcement of planned maintenance or a failure in the cloud or the communication) on switching of the states of the controller devices 10. Here, if the control switching devices 50 receive a notice of switching of the states from the monitoring device, the control switching devices 50 perform switching such that the state of at least one of the controller devices 10 enters the active state. In other words, the process control system 100 gives a notice of the planned maintenance in advance and switches between the active states and the standby states of the controller devices 10 in advance, so that it is possible to reduce downtimes of the controller devices 10. Furthermore, when a failure has occurred or there is a sign of a failure, and if operation of the controlled devices 10 is likely to be affected, the process control system 100 switches between the active states and the standby states of the controller devices 10 in advance, so that it is possible to reduce downtimes of the controller devices 10.

3. Process Performed by Each Device

Figure 3:
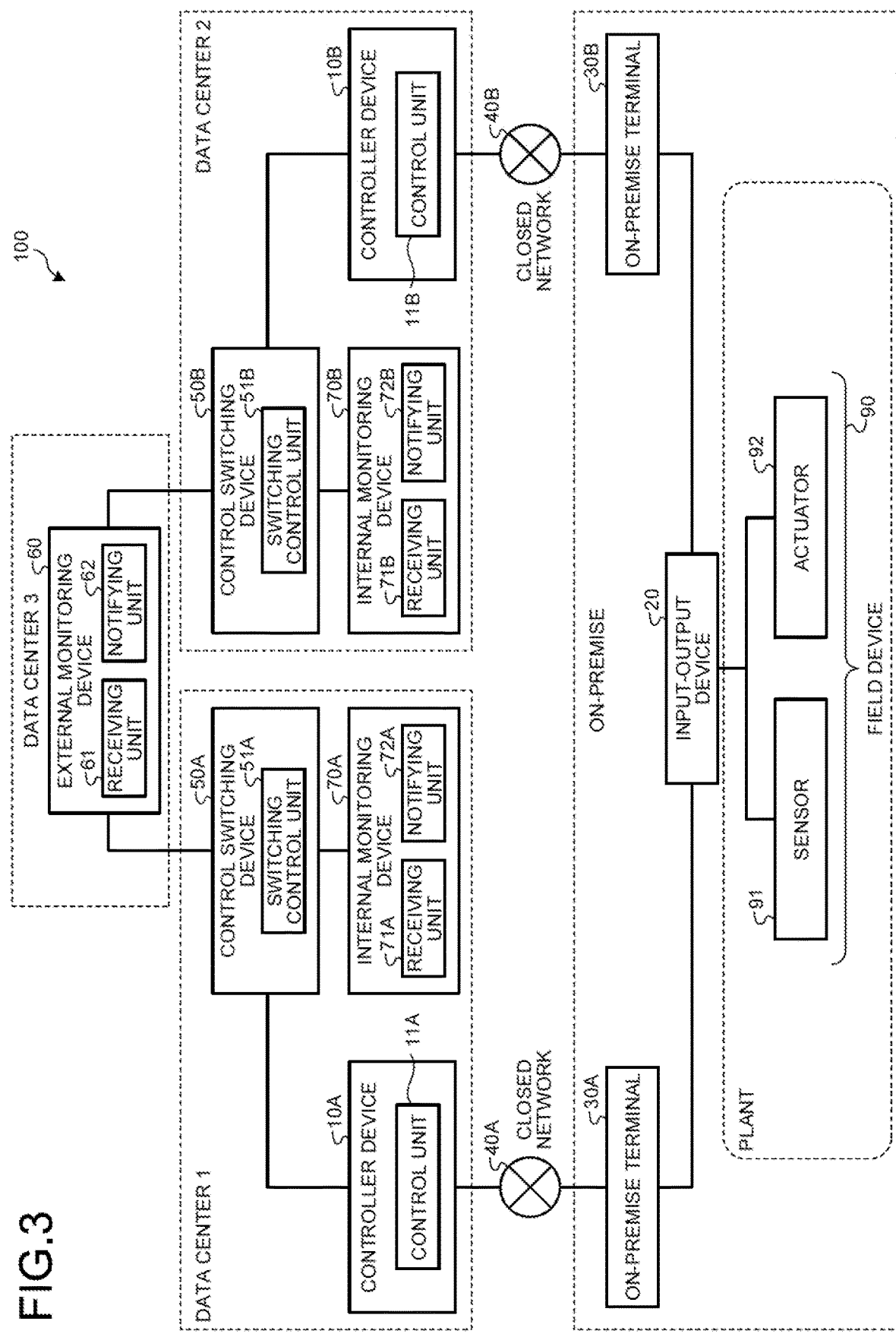
FIG. 3 is a block diagram illustrating a configuration example of each of devices in the process control system according to the present embodiment.

A process performed by each of the devices included in the process control system 100 will be described in detail below with reference to FIG. 3. FIG. 3 is a block diagram illustrating a configuration example of each of the devices included in the process control system according to the present embodiment. In the following, the controller devices 10 (10A, 10B), the input-output device 20, the on-premise terminals 30 (30A, 30B), the closed networks 40 (40A, 40B), the control switching devices 50 (50A, 50B), the external monitoring device 60, and the internal monitoring devices 70 (70A, 70B) will be described in this order.

3-1. Controller Devices 10

The controller devices 10 perform process control on the plant. At this time, the plurality of controller devices 10 (10A, 10B) are connected to the input-output device 20 via different communication networks (networks). For example, each of the controller devices 10 (10A, 10B) is connected to the input-output device 20 via the different closed network 40 (40A, 40B) or the Internet. Further, each of the controller devices 10 (10A, 10B) is installed in the different data center.

Control units 11 (11A, 11B) of the controller devices 10 transmit and receive information (control data) on the process control to and from the input-output device 20.

3-2. Input-Output Device 20

The input-output device 20 is connected to a target device of the process control, and transmits and receives the control data to and from the target device. For example, the input-output device 20 is installed in a different on-premise environment from the plurality of controller devices 10, and transmits and receives the control data to and from the target device of the process control. As a specific example, the input-output device 20 is connected to the field devices 90, such as the sensor 91 and the actuator 92, in the plant that is the on-premise environment, and acquires the control data from the field devices 90. At this time, the input-output device 20 acquires, as the control data, process data, such as a detection result (for example, pressure, temperature, a flow rate, or the like), of the sensor 91 that is the field device 90, and a control parameter, such as a setting value, of the actuator 92 that is the field device 90.

3-3. On-Premise Terminals 30

The on-premise terminals 30 relay, as data gateways, such as routers, data communication between the controller devices 10 and the input-output device 20. For example, the on-premise terminals 30 are connected to the input-output device 20, are connected to the controller devices 10 via the closed networks 40, and relay transmission and reception of the control data between the controller devices 10 and the input-output device 20.

3-4. Closed Networks 40

The closed networks 40 are one example of a communication network that is used to realize periodicity, such as a 1-second period, and are connected, as dedicated lines of the controller devices 10 that are installed in the respective data centers, so as to enable data communication between the controller devices 10 and the input-output device 20, for example. For example, the plurality of closed networks 40 (40A, 40B) are connected to the respective controller devices 10 (10A, 10B) so as to enable transmission and reception of the control data. Furthermore, the closed networks 40 are connected to the input-output device 20 via the on-premise terminals 30 so as to enable transmission and reception of the control data.

Moreover, while the closed networks 40 are used as the communication networks in the examples illustrated in FIG. 1 and FIG. 3, the networks are not specifically limited as long as the networks connect the cloud and the on-premise. For example, in the process control system 100, it is possible to use the Internet as the communication networks, instead of the closed networks 40. Meanwhile, to realize the periodicity, such as a 1-second period, in the process control system 100, it is preferable to use the closed networks 40 in which a communication delay is smaller than the internet.

3-5. Control Switching Devices 50

Switching control units 51 of the control switching devices 50 switch the states of the controller devices 10 to the active states, the standby states, or the stopped states. For example, when receiving a notice related to switching of the states of the controller devices 10 from the external monitoring device 60 or the internal monitoring devices 70, the switching control units 51 of the control switching devices 50 performs switching such that the state of at least one of the controller devices 10 enters the active state. Meanwhile, details of the state switching process performed by the control switching devices 50 will be described later in the section "4. Specific examples of process control system 100" and the section "5. Flow of each of processes".

3-6. External Monitoring Device 60

A receiving unit 61 of the external monitoring device 60 receives the information on switching of the states of the controller devices 10. Further, a notifying unit 62 of the external monitoring device 60 transmits a notice related to the switching of the states of the controller devices 10 to the respective control switching devices 50 (50A, 50B) that are installed in the respective data centers. At this time, the external monitoring device 60 is installed in a different data center from each of the data centers in which each of the controller devices 10 (10A, 10B) is installed.

As a specific example, the receiving unit 61 of the external monitoring device 60 receives, as the information on the switching of the states of the controller device 10, information on planned maintenance that is notified by the cloud vender or the communication vender. The planned maintenance is maintenance related to operation of each of the data centers and each of the controller devices 10. For example, the maintenance includes maintenance in each of the data centers that provide physical resources to each of the controller devices 10, and examples of the maintenance include enhancement of a processor or hardware and version upgrade of various kinds of software, such as virtual software that implements a virtual machine or container software that implements a container, for example.

3-7. Internal Monitoring Devices 70

Receiving units 71 of the internal monitoring devices 70 receive the information on the switching of the states of the controller devices 10. Further, notifying units 72 of the internal monitoring devices 70 transmit a notice related to the switching of the states of the controller devices 10 to the control switching devices 50 that are installed in the respective data centers. At this time, the internal monitoring devices 70 are installed in the respective data centers in which the respective controller devices 10 (10A, 10B) are installed.

As a specific example, the receiving units 71 of the internal monitoring devices 70 receive, as the information on the switching of the states of the controller devices 10, information on a failure in the cloud infrastructure or the communication infrastructure. Here, the receiving units 71 of the internal monitoring devices 70 are able to detect depletion of hardware resources or the like in the data centers and accept the detection as information on a failure. For example, the receiving units 71 of the internal monitoring devices 70 detect shortage of physical memories or virtual memories, blocking or convergence of the communication paths in the data centers, blocking or convergence of the communication paths between the data centers, a decrease in a communication speed between the data centers and the on-premise, or the like. Meanwhile, well-known failure detection software or the like may be used as a detecting means.

4. Specific Examples of Process Control System 100

Figure 4:
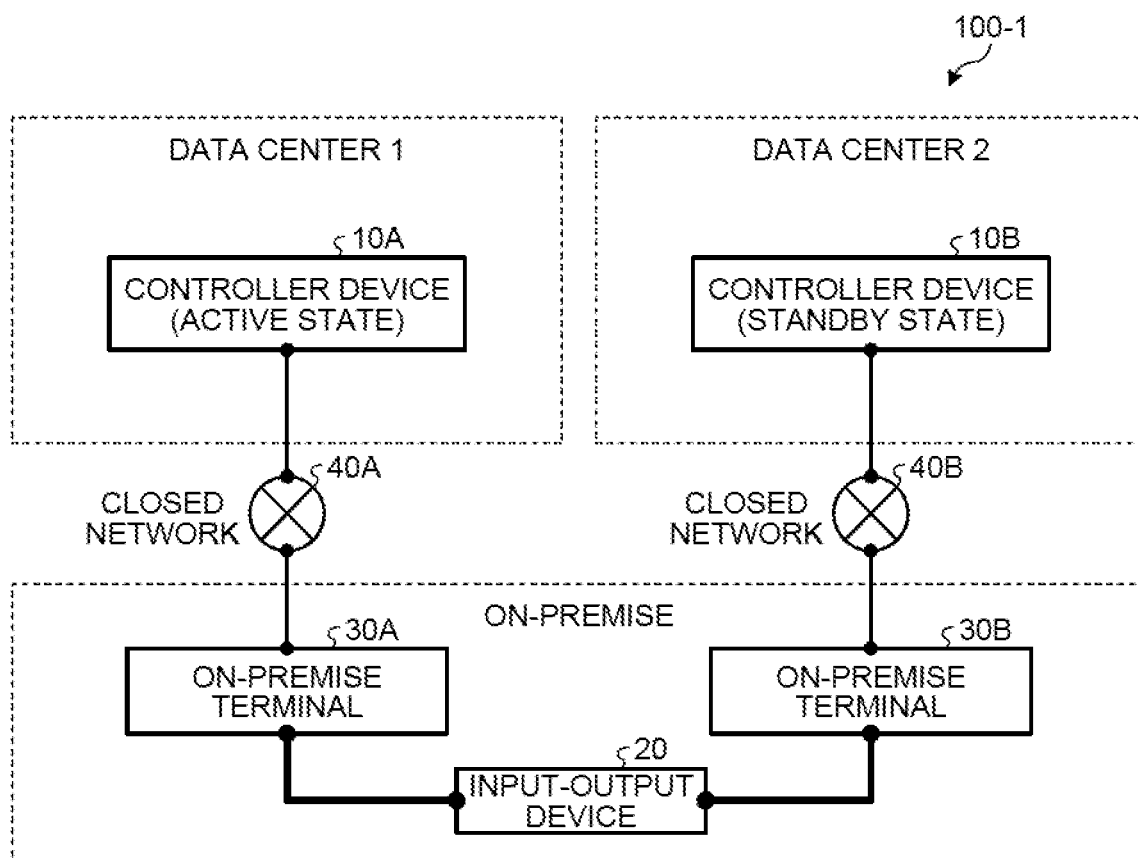
FIG. 4 is a diagram illustrating a first specific example of the process control system according to the present embodiment.
Figure 5:
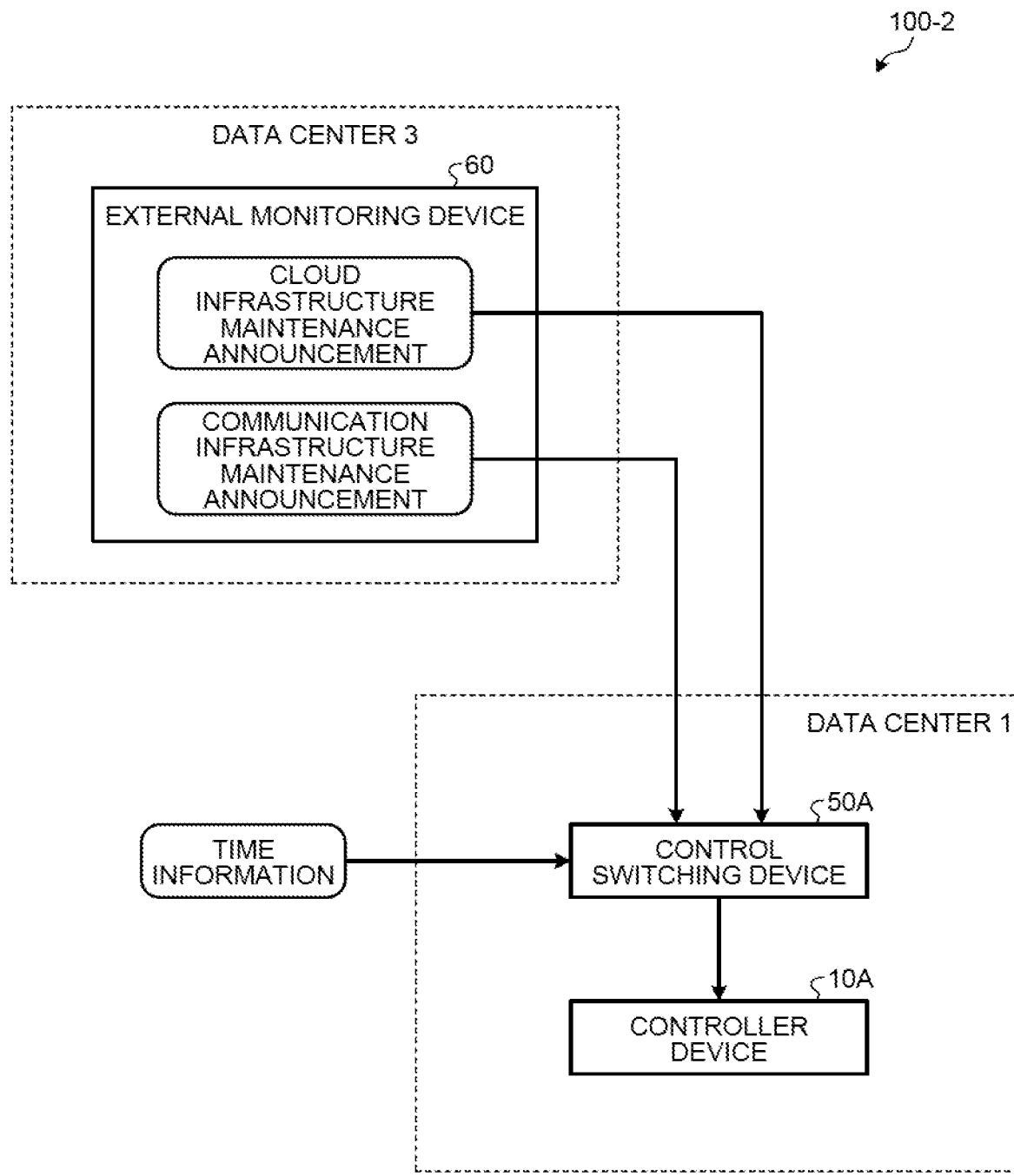
FIG. 5 is a diagram illustrating a second specific example of the process control system according to the present embodiment.
Figure 6:
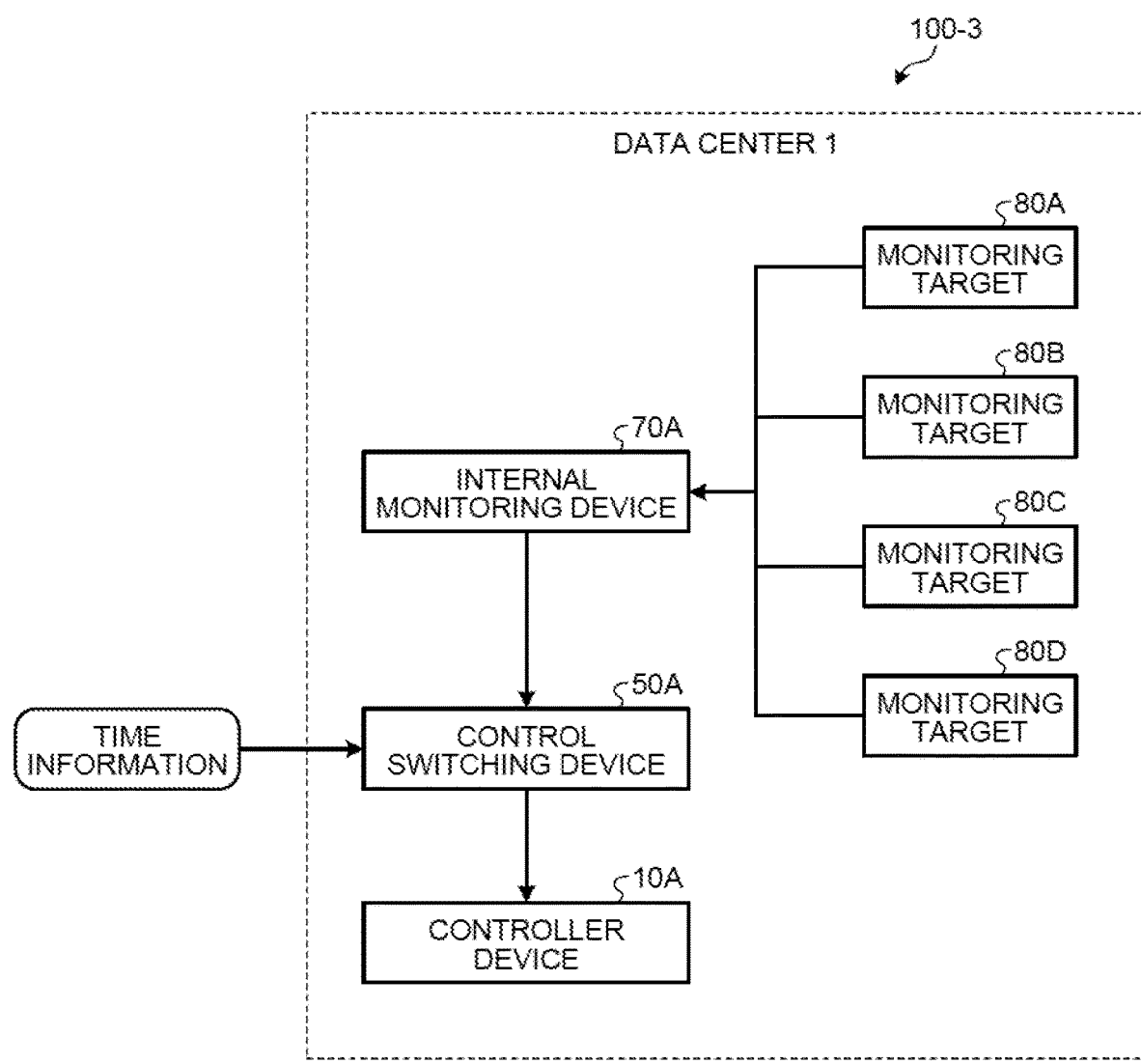
FIG. 6 is a diagram illustrating a third specific example of the process control system according to the present embodiment.

Specific examples of the process control system 100 according to the present embodiment will be described in detail below with reference to FIG. 4 to FIG. 6. FIG. 4 to FIG. 6 are diagrams illustrating the specific examples of the process control system according to the present embodiment.

4-1. First Specific Example

A configuration example of a process control system 100-1 that does not include the control switching devices 50 and the monitoring device, such as the external monitoring device 60 or the internal monitoring devices 70, will be described below as a first specific example with reference to FIG. 4. Meanwhile, in FIG. 4, the plant and the configurations included in the plant as illustrated in FIG. 1 and FIG. 3 are omitted. Further, the configurations of the controller devices 10, the input-output device 20, the on-premise terminals 30, and the closed networks 40 are the same as those illustrated in FIG. 1 and FIG. 3, and therefore, explanation thereof will be omitted.

In the following, a main point of the process control system 100-1 illustrated in FIG. 4 will be described. Firstly, in the process control system 100-1, the controller device 10A and the controller device 10B are respectively installed in the data center 1 and the data center 2 that are external data centers. Secondly, in the process control system 100-1, the closed networks 40 or the like are used as the communication paths to realize low latency environments. Thirdly, in the process control system 100-1, the controller devices 10 have a redundant configuration including the active state and the standby state, and are installed in the different data centers as described above. Furthermore, in the process control system 100-1, the communication paths are separately prepared, so that a different system is provided from each of the controller devices 10 to the input-output device 20.

As in the process control system 100-1 as described above, the process control system 100 may be configured so as not to include the control switching devices 50 and the monitoring devices, such as the external monitoring device 60 or the internal monitoring devices 70. In the process control system 100-1 as described above, the controller devices 10 are configured in a redundant manner, so that it is possible to prevent both of the two controller devices 10, one of which is in the active state and the other one of which is in the standby state, from being stopped due to a single breakdown or maintenance. Furthermore, in the process control system 100-1 as described above, the communication paths of the controller devices 10 are separately prepared, so that it is possible to implement the configuration in which the 1-second period can be ensured in the process control.

4-2. Second Specific Example

A configuration example of a process control system 100-2 that includes only the external monitoring device 60 as the monitoring device will be described below as a second specific example with reference to FIG. 5. Meanwhile, in FIG. 5, only the configurations included in the data center 1 and the data center 3 illustrated in FIG. 1 and FIG. 3 are illustrated, and the other configurations are omitted.

In the following, a main point of the process control system 100-2 illustrated in FIG. 5 will be described. Firstly, in the process control system 100-2, the external monitoring device 60 for monitoring the cloud infrastructure and the communication infrastructure is installed. In FIG. 5, the external monitoring device 60 is installed in the data center 3 that is different from the data center 1 and the data center 2 in which the controller device 10A and the controller device 10B are installed; however, the external monitoring device 60 may be installed in the same data center as any of the controller devices 10.

Secondly, in the process control system 100-2, the control switching device 50 is installed in the same data center as the controller device 10. In FIG. 5, the control switching device 50A is installed in the data center 1 in which the controller device 10A is installed; however, the control switching device 50A may be installed in a different data center (not illustrated).

Thirdly, in the process control system 100-2, the external monitoring device 60 monitors the states of the cloud infrastructure and the communication infrastructure, and gives a notice to the control switching device 50 if it is needed to perform switching control of the state of the controller device 10. As illustrated in FIG. 5, the external monitoring device 60 acquires cloud infrastructure maintenance announcement information from the cloud vender. Furthermore, similarly, the external monitoring device 60 acquires communication infrastructure maintenance announcement information from the communication vender. Meanwhile, determination on whether to perform the switching control may be performed based on a criterion that is set in advance by an administrator of the system or the like, or the administrator of the system or the like may be allowed to manually perform the switching control.

Fourthly, in the process control system 100-2, when acquiring the announcement information as described above, the control switching device 50 switches the state of the controller device 10 before stopping due to the planned maintenance indicated by the announcement information. As illustrated in FIG. 5, the control switching device 50 acquires the announcement information from the external monitoring device 60, acquires time information on the planned maintenance, and switches the controller device 10A in the active state to the standby state or the stopped state. At this time, the control switching device 50 acquires the announcement information as described above by an electronic mail or a short message service (SMS), but an acquiring means is not specifically limited. Furthermore, the control switching device 50 may acquire the time information (for example, a maintenance start time, a maintenance end time, or the like) on the planned maintenance from the external monitoring device 60, or may acquire the time information as input data from an operator or the like. Moreover, the control switching device 50 performs the switching control on the state of the controller device 10A via an application programming interface (API), but a switching means is not specifically limited.

As in the process control system 100-2 as described above, the process control system 100 may be configured so as to include the control switching devices 50 and the external monitoring device 60, but not include the internal monitoring devices 70. At this time, even if the controller device 10 in the active state is stopped due to the planned maintenance, the process control system 100-2 is able to ensure the 1-second period for the process control in the plant.

4-3. Third Specific Example

A configuration example of a process control system 100-3 that includes only the internal monitoring device 70 as the monitoring device will be described below as a third specific example with reference to FIG. 6. Meanwhile, in FIG. 6, only the configurations included in the data center 1 illustrated in FIG. 1 and FIG. 3 are illustrated, and the other configurations are omitted.

In the following, a main point of the process control system 100-3 illustrated in FIG. 6 will be described. Firstly, in the process control system 100-3, the internal monitoring device 70 for monitoring the cloud infrastructure and the communication infrastructure is installed. In FIG. 6, the internal monitoring device 70A is installed in the data center 1 in which the controller device 10A is installed, but may be installed in a different data center from the controller device 10A.

Secondly, in the process control system 100-3, the control switching device 50 is installed in the same data center as the controller device 10. In FIG. 6, the control switching device 50A is installed in the data center 1 in which the controller device 10A is installed; however, the controls switching device may be installed in a different data center (not illustrated).

Thirdly, in the process control system 100-3, the internal monitoring device 70 monitors the states of the cloud infrastructure and the communication infrastructure, and gives a notice to the control switching device 50 if it is needed to perform switching control of the state of the controller device 10. As illustrated in FIG. 6, the internal monitoring device 70A monitors monitoring targets 80 (80A, 80B, 80C, 80D) in the data center 1, and acquires various kinds of information. At this time, the internal monitoring device 70 monitors a resource state (for example, a central processing unit (CPU) or a disk input/output (I/O)) inside the cloud infrastructure or the like, and gives a notice to the control switching device 50 if operation of the controller device 10 is likely to be affected. Furthermore, the internal monitoring device 70 periodically monitors, as a sensor virtual machine, a communication path from the cloud to the on-premise, and gives a notice to the control switching device if an unacceptable communication delay has occurred. Meanwhile, determination on whether to perform the switching control may be performed based on a criterion that is set in advance by an administrator of the system or the like, or the administrator of the system or the like may be allowed to manually perform the switching control.

Fourthly, in the process control system 100-3, the control switching device 50 switches the state of the controller device 10 if operation of the controller device 10 is likely to be affected. Specifically, the control switching device 50 switches the state of the controller device 10 when receiving a notice (failure control notice) indicating that abnormality is detected from the internal monitoring device 70. As illustrated in FIG. 6, the control switching device 50 receives the failure control notice from the internal monitoring device 70, acquires the time information on the failure, and switches the controller device 10A in the active state to the standby state or the stopped state. At this time, the control switching device 50 acquires the failure control notice as described above via an API system call, but an acquiring means is not specifically limited. Furthermore, the control switching device 50 may acquire information (for example, a time in which a communication failure is likely to occur, or the like) on a failure from the internal monitoring device 70, or may acquire the time information as input data from an operator or the like. Moreover, the control switching device 50 performs the switching control of the state of the controller device 10A via the API, but a switching means is not specifically limited.

As in the process control system 100-3 as described above, the process control system 100 may be configured so as to include the control switching device 50 and the internal monitoring device 70, but not include the external monitoring device 60. At this time, even if the controller device 10 in the active state is stopped due to a breakdown or a failure in the cloud infrastructure or the communication infrastructure, the process control system 100-3 is able to ensure the 1-second period for the process control in the plant.

5. Flow of Each Process

Figure 7:
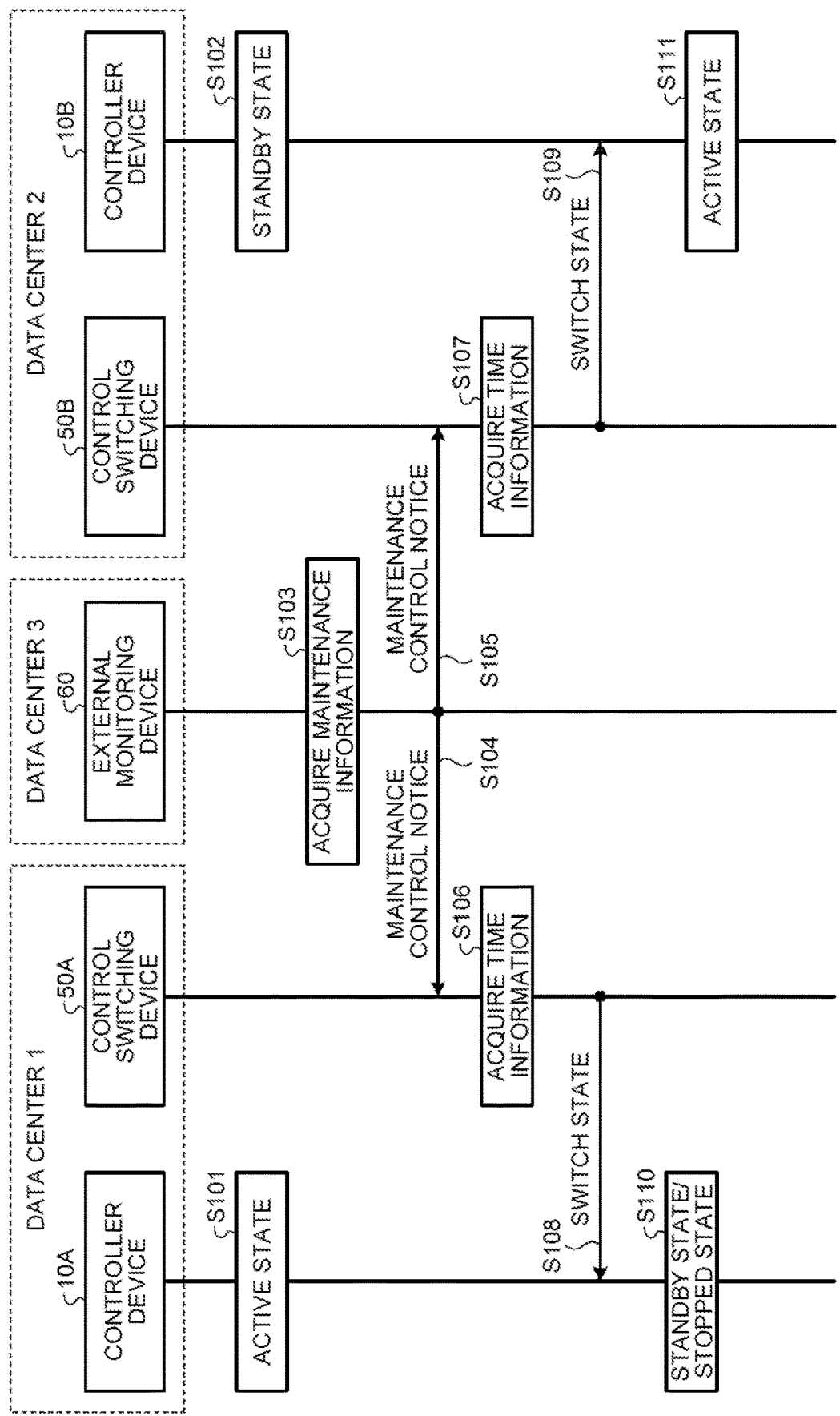
FIG. 7 is a sequence diagram illustrating an example of the flow of a process control process according to the present embodiment.
Figure 8:
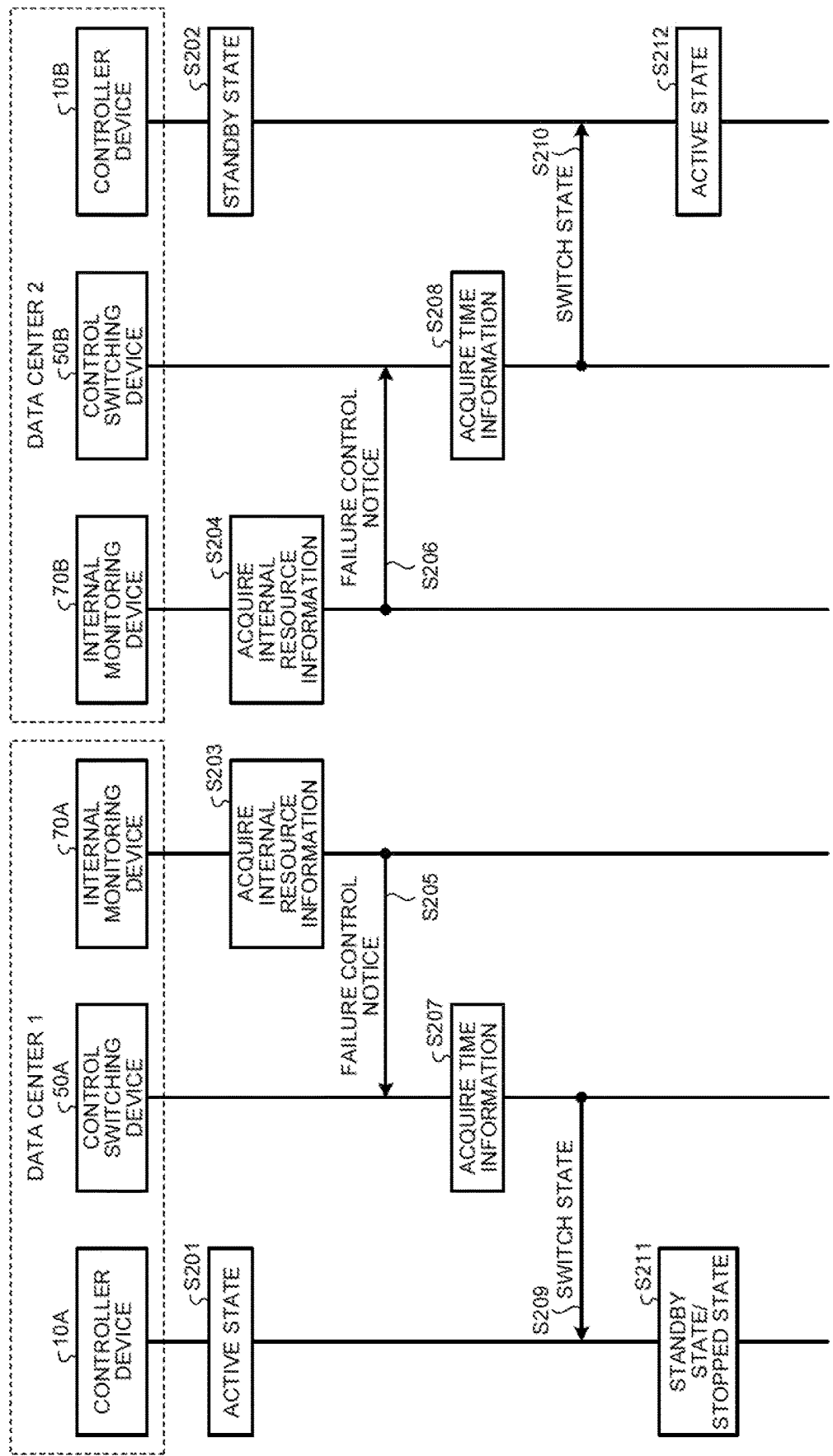
FIG. 8 is a sequence diagram illustrating an example of the flow of the process control process according to the present embodiment.

A flow of a process control process according to the present embodiment will be described below with reference to FIG. 7 and FIG. 8. FIG. 7 and FIG. 8 are sequence diagrams illustrating one example of the flow of the process control process according to the present embodiment. In the following, the flow of the state switching process performed by the external monitoring device 60 and the flow of the state switching process performed by the internal monitoring device 70 will be particularly explained in detail.

5-1. Flow of State Switching Process Performed by External Monitoring Device 60

The flow of the state switching process performed by the external monitoring device 60 will be described in detail below with reference to FIG. 7. Meanwhile, Steps S101 to S111 described below may be performed in different order. Further, any of processes or states in Steps S101 to S111 below may be omitted.

An example will be described in which, as illustrated in FIG. 1, the controller device 10A installed in the data center 1 is in the active state (Step S101), and the controller device 10B installed in the data center 2 is in the standby state (Step S102).

First, the external monitoring device 60 installed in the data center 3 acquires maintenance information that is announcement information on planned maintenance from the cloud vender or the communication vender (Step S103). Subsequently, the external monitoring device 60 transmits a maintenance control notice due to the planned maintenance to the control switching device 50A that is installed in the data center 1 (Step S104). Furthermore, the external monitoring device 60 transmits the maintenance control notice due to the planned maintenance to the control switching device 50B that is installed in the data center 2 (Step S105).

Subsequently, the control switching device 50A acquires the time information on a time at which the planned maintenance is to be performed, or the like (Step S106). Furthermore, the control switching device 50B similarly acquires the time information on the time at which the planned maintenance is to be performed, or the like (Step S107). At this time, the control switching device 50A and the control switching device 50B may acquire the time information as described above from the external monitoring device 60, or may acquire the time information as input data from an operator or the like.

Then, the control switching device 50A switches the state of the controller device 10A (Step S108). As a result, the state of the controller device 10A that has been in the active state is switched to the standby state or the stopped state (Step S110). In contrast, the control switching device 50B switches the state of the controller device 10B (Step S109). As a result, the state of the controller device 10A that has been in the standby state is switched to the active state (Step S111).

5-2. Flow of State Switching Process Performed by The Internal Monitoring Device 70

A flow of the state switching process performed by the internal monitoring device 70 will be described in detail below with reference to FIG. 8. Meanwhile, Steps S201 to S212 described below may be performed in different order. Further, any of processes or states in Steps S201 to S212 below may be omitted.

An example will be described in which, as illustrated in FIG. 1, the controller device 10A installed in the data center 1 is in the active state (Step S201) and the controller device 10B installed in the data center 2 is in the standby state (Step S202).

First, the internal monitoring device 70A installed in the data center 1 acquires internal resource information that is a monitoring result of internal resources of the cloud infrastructure and the communication infrastructure related to the data center 1 (Step S203). Furthermore, the internal monitoring device 70B installed in the data center 2 similarly acquires internal resource information that is a monitoring result of internal resources of the cloud infrastructure and the communication infrastructure related to the data center 2 (Step S204). At this time, the internal monitoring device 70A and the internal monitoring device 70B may share the internal resource information via a communication network (not illustrated).

Subsequently, if there is a possibility of a failure from the internal resource information as described above, the internal monitoring device 70A transmits a failure control notice due the failure in the cloud infrastructure or the communication infrastructure to the control switching device 50A that is installed in the data center 1 (Step S205). Furthermore, the internal monitoring device 70B transmits a failure control notice due to the failure in the cloud infrastructure or the communication infrastructure to the control switching device 50B that is installed in the data center 2 (Step S206).

Subsequently, the control switching device 50A acquires the time information on a time at which the communication failure has occurred, or the like (Step S207). Furthermore, the control switching device 50B similarly acquires the time information on the time at which the communication failure has occurred, or the like (Step S208). At this time, the control switching device 50A and the control switching device 50B may acquire the time information as described above from the internal monitoring device 70A or the internal monitoring device 70B, or may acquire the time information as input data from an operator or the like.

Then, the control switching device 50A switches the state of the controller device 10A (Step S209). As a result, the state of the controller device 10A that has been in the active state is switched to the standby state or the stopped state (Step S211). In contrast, the control switching device 50B switches the state of the controller device 10B (Step S210). As a result, the state of the controller device 10A that has been in the standby state is switched to the active state (Step S212).

6. Effects of Embodiment

Firstly, the process control system 100 according to the present embodiment as described above includes the plurality of controller devices 10 each of which performs process control on a plant and the input-output device 20 that is connected to target devices of the process control. The input-output device 20 is installed in a different on-premise environment from the plurality of controller devices 10. Each of the controller devices 10 is connected to the input-output device 20 by a different communication network, and transmits and receives information on the process control to and from the input-output device 20. Therefore, in the process control system 100, it is possible to implement effective process control on the plant while maintaining high availability.

Secondly, in the process control system 100 according to the present embodiment as described above, each of the controller devices 10 is installed in a different data center, the process control system 100 further includes the control switching device 50 that switches the state of each of the controller devices 10 to the active state, the standby state, or the stopped state and the monitoring device that receives the information on the switching of the state of each of the controller devices 10, and the control switching device 50 performs switching such that the state of at least one of the controller devices 10 enters the active state upon receiving a notice related to the switching of the state of the controller device 10 from the monitoring device. Therefore, in the process control system 100, it is possible to implement effective process control in the plant while maintaining high availability in the cloud environment.

Thirdly, in the process control system 100 according to the present embodiment as described above, the monitoring device is installed in a different data center from each of the data centers in which each of the controller devices 10 is installed, and transmits the notice related to the switching of the state of the controller device 10 to each of the control switching devices 50 installed in each of the data centers. Therefore, in the process control system 100, with use of the external monitoring device, it is possible to implement effective process control on the plant while maintaining high availability in the cloud environment.

Fourthly, in the process control system 100 according to the present embodiment as described above, the monitoring device receives, as the information on the switching of the state of the controller device 10, information on planned maintenance that is notified by the cloud vender or the communication vender. Therefore, in the process control system 100, with use of the external monitoring device, even if planned maintenance of the cloud infrastructure or the communication infrastructure is to be performed, it is possible to implement effective process control on the plant while maintaining high availability in the cloud environment.

Fifthly, in the process control system 100 according to the present embodiment as described above, the monitoring device is installed in each of the data centers in which each of the controller devices is installed, and the monitoring device transmits the notice related to the switching of the state of the controller device 10 to the control switching device installed in each of the data centers. Therefore, in the process control system 100, with use of the internal monitoring device, it is possible to implement effective process control on the plant while maintaining high availability in the cloud environment.

Sixthly, in the process control system 100 according to the present embodiment as described above, the monitoring device receives, as the information on the switching of the state of the controller device 10, the information on a failure in the cloud infrastructure or the communication infrastructure. Therefore, in the process control system 100, with use of the internal monitoring device, even if a failure occurs in the cloud infrastructure or the communication infrastructure, it is possible to implement effective process control on the plant while maintaining high availability in the cloud environment.

Seventhly, in the process control system 100 according to the present embodiment as described above, the plurality of controller devices 10 are connected to the input-output device 20 by the different closed networks 40, and transmit and receive information on the process control to and from the input-output device 20. Therefore, in the process control system 100, it is possible to implement effective process control on the plant with a low communication delay while maintaining high availability.

System

The processing procedures, control procedures, specific names, and information including various kinds of data and parameters illustrated in the above-described document and drawings may be arbitrarily changed unless otherwise specified.

Furthermore, the components of the devices illustrated in the drawings are functionally conceptual and do not necessarily have to be physically configured in the manner illustrated in the drawings. In other words, specific forms of distribution and integration of the devices are not limited to those illustrated in the drawings. That is, all or part of the devices may be functionally or physically distributed or integrated in arbitrary units depending on various loads or use conditions.

Moreover, for each processing function performed by each device, all or any part of the processing function may be implemented by a CPU and a program analyzed and executed by the CPU or may be implemented as hardware by wired logic.

Hardware

Figure 9:
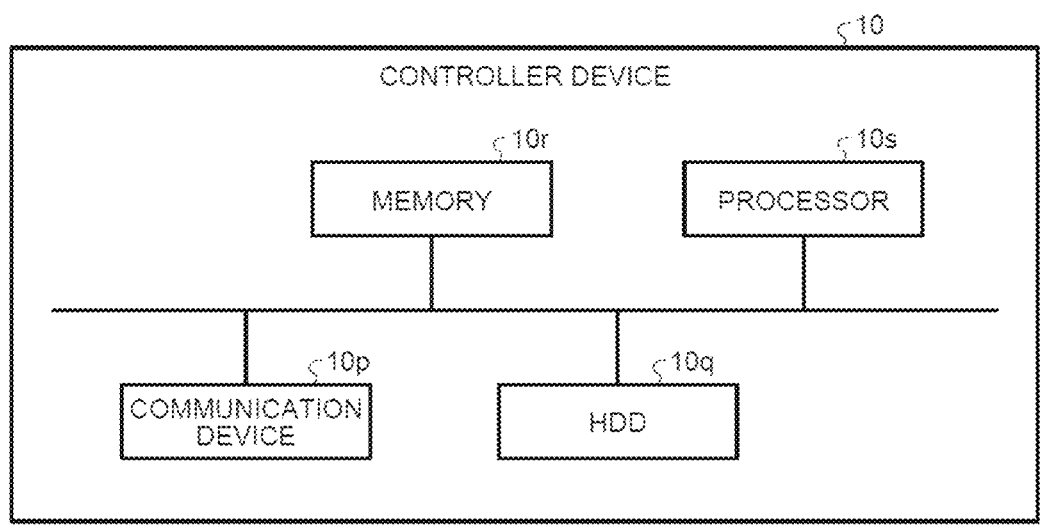
FIG. 9 is a diagram for explaining a hardware configuration example of a controller device according to the present embodiment.

A hardware configuration example of the controller device 10 will be described below. Meanwhile, the same hardware configuration may be adopted to the other devices. FIG. 9 is a diagram for explaining a hardware configuration example according to the present embodiment. As illustrated in FIG. 9, the controller device 10 includes a communication device 10$p$, a hard disk drive (HDD) 10$q$, a memory 10$r$, and a processor 10$s$. Further, all of the units illustrated in FIG. 9 are connected to one another via a bus or the like.

The communication device 10$p$ is a network interface card or the like and communicates with a different server. The HDD 10$q$ stores therein a program and a database (DB) for implementing the functions illustrated in FIG. 3.

The processor 10$s$ reads the program for executing the processes illustrated in FIG. 3 from the HDD 10$q$ or the like, loads the program onto the memory 10$r$, and executes the process that implements each of the functions illustrated in FIG. 3.

As described above, the controller device 10 operates as a device that implements various processing methods by reading and executing the program. Further, the controller device 10 may cause a medium reading device to read the above-described program from a recording medium, execute the above-described program, and implement the same functions as the embodiment as described above. Meanwhile, the program referred to in the this embodiment need not always be executed by the controller device 10. For example, the present invention may be similarly applied to a case in which a different computer or a different server executes the program or a case in which the different computer and the different server execute the program in a cooperative manner.

The program may be distributed via a network, such as the Internet. Further, the program may be recorded in a computer readable recording medium, such as a hard disk, a flexible disk (FD), a compact disc-read only memory (CD-ROM), a magneto-optical disk (MO), or a digital versatile disk (DVD), and may be executed by being read from the recording medium by the computer.

According to the present invention, it is possible to realize effective process control on a plant while maintaining high availability.

What is claimed is:

1. A control system comprising:
   a plurality of controller devices each performing process control on a plant and being installed in a different data center from one another;
   an input-output device that is connected to a target device of the process control;
   a control switching device that switches a state of each of the controller devices to one of an active state, a standby state, and a stopped state; and
   a monitoring device that receives information on switching of the state, wherein
   the control switching device includes a switch control unit that performs switching such that the state of at least one of the controller devices enters the active state upon receiving a notice related to switching of the state from the monitoring device,
   the input-output device is installed in an on-premise environment, separate from the environment that includes the plurality of controller devices,
   each of the controller devices is connected to the input-output device by a different dedicated closed network, and includes a control unit that transmits and receives information on the process control to and from the input-output device, and
   the monitoring device further includes
      an external monitoring device that is installed in a different data center from each of the data centers in which each of the controller devices is installed and that is configured to monitor information on planned maintenance that is notified by one of a cloud vender and a communication vender and that is configured to switch the state of the controller devices according to the information on the planned maintenance, and
      a plurality of internal monitoring devices that are installed in each of the data centers in which each of the controller devices is installed and that are configured to monitor information on a failure in one of a cloud infrastructure and a communication infrastructure and that are configured to switch the state of the controller devices according to the information on the failure.

2. The control system according to claim 1, wherein
   the external monitoring device further includes
   a notifying unit that transmits the notice related to switching of the state to each of control switching devices installed in each of the data centers.

3. The control system according to claim 1, wherein
   the external monitoring device further includes
      a receiving unit that receives, as the information on switching of the state, information on planned maintenance that is notified by one of the cloud vender and the communication vender.

4. The control system according to claim 1, wherein each of the internal monitoring devices includes a notifying unit that transmits the notice related to switching of the state to the control switching device installed in each of the data centers.

5. The control system according to claim 1, wherein each of the internal monitoring devices includes a receiving unit that receives, as the information on switching of the state, information on a failure in one of the cloud infrastructure and the communication infrastructure.

6. A control method of a control system, the control system including
- a plurality of controller devices each performing process control on a plant and being installed in a different data center from one another;
- an input-output device that is connected to a target device of the process control;
- a control switching device that switches a state of each of the controller devices to one of an active state, a standby state, and a stopped state; and
- a monitoring device that receives information on switching of the state, wherein
- the input-output device is installed in an on-premise environment, separate from the environment that includes the plurality of controller devices,
- each of the controller devices is connected to the input-output device by a different dedicated closed network,
- the monitoring device further includes
  - an external monitoring device that is installed in a different data center from each of the data centers in which each of the controller devices is installed and that is configured to monitor information on planned maintenance that is notified by one of a cloud vender and a communication vender and that is configured to switch the state of the controller devices according to the information on the planned maintenance, and
  - a plurality of internal monitoring devices that are installed in each of the data centers in which each of the controller devices is installed and that are configured to monitor information on a failure in one of a cloud infrastructure and a communication infrastructure and that are configured to switch the state of the controller devices according to the information on the failure, and
- the control method comprising:
  - transmitting and receiving information on the process control between each of the controller devices and the input-output device.

* * * * *